Patented July 24, 1928.

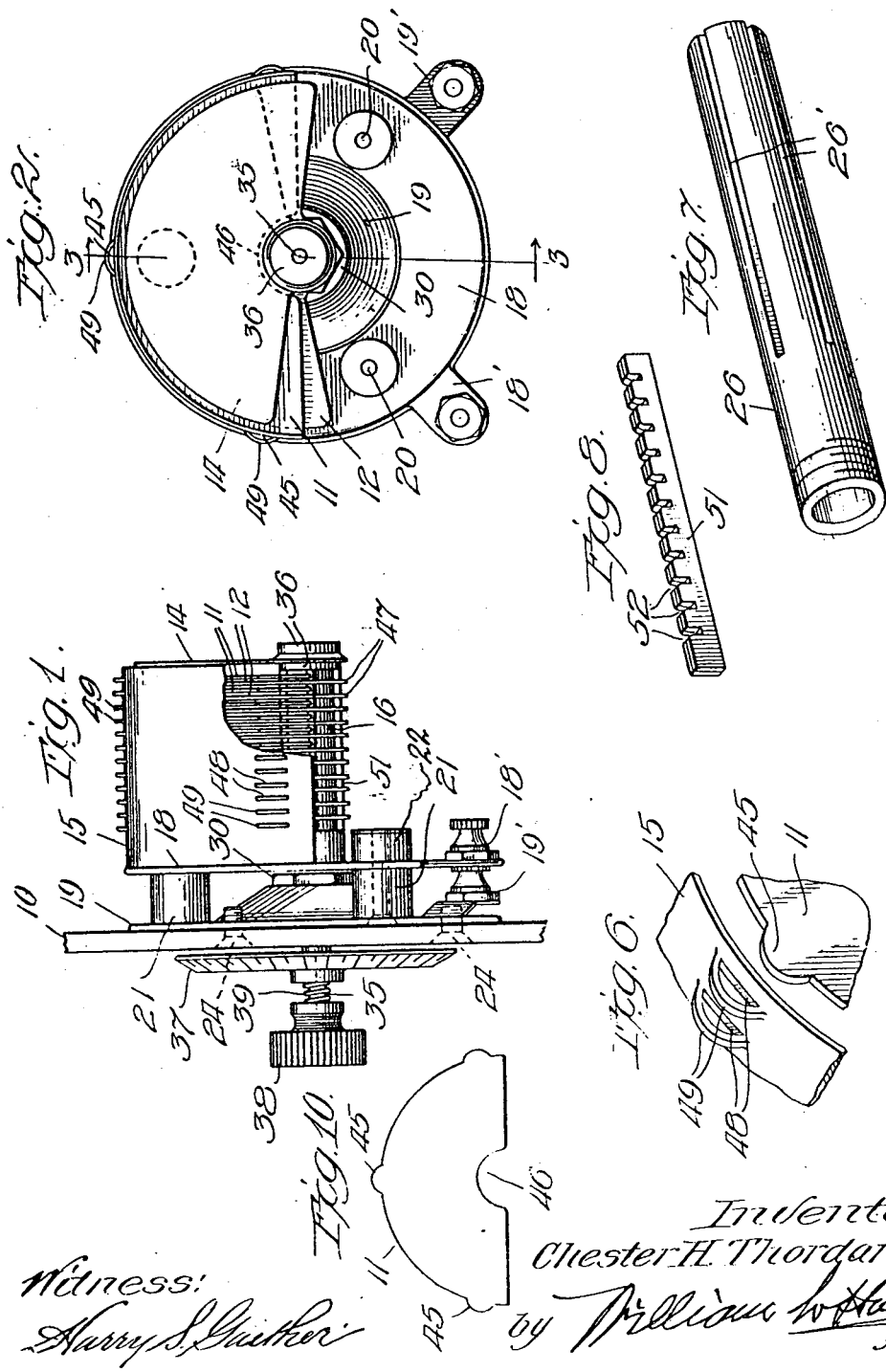

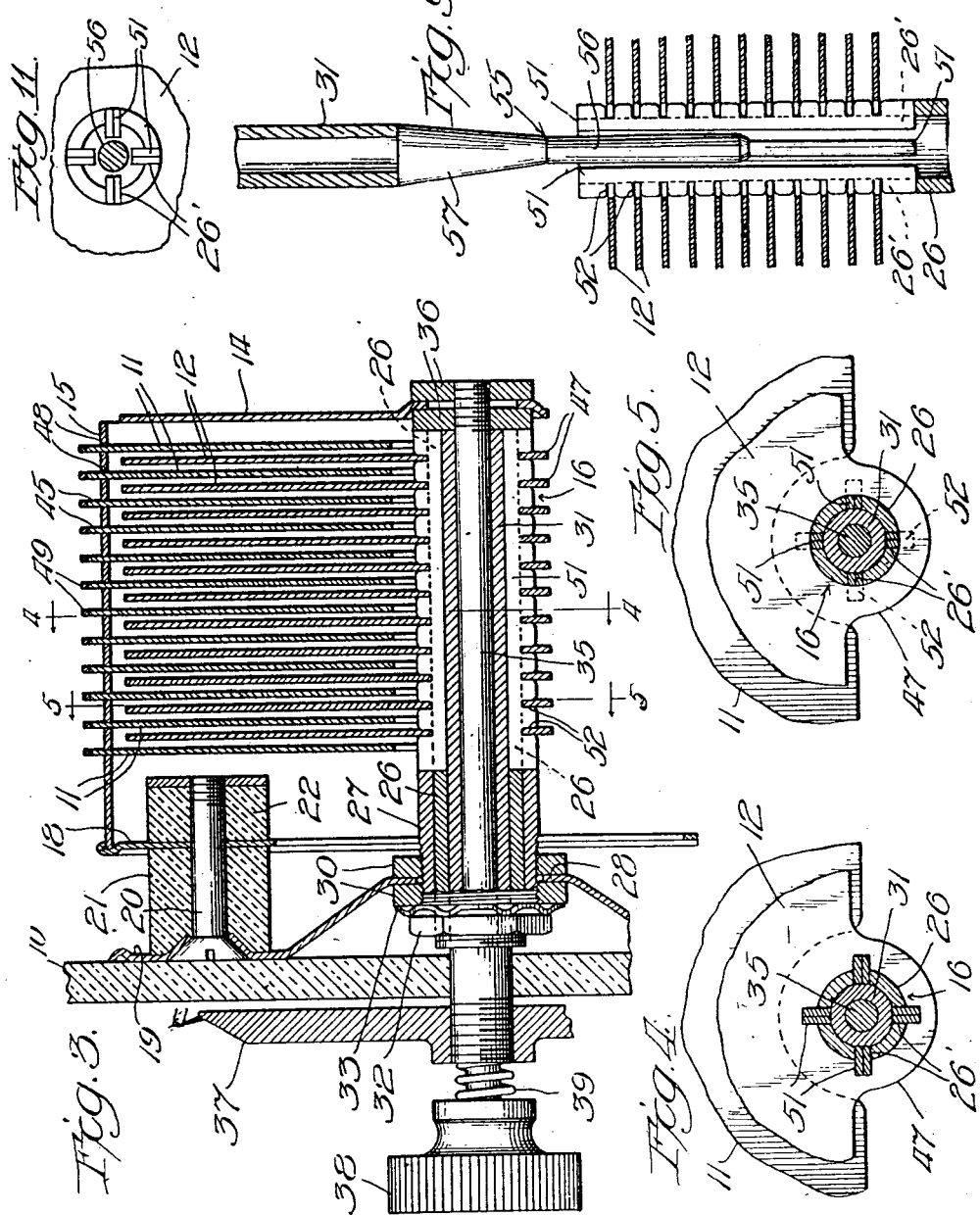

1,677,935

UNITED STATES PATENT OFFICE.

CHESTER H. THORDARSON, OF CHICAGO, ILLINOIS.

ADJUSTABLE ELECTRIC CONDENSER.

Application filed December 26, 1922. Serial No. 608,861.

This invention relates to improvements in variable or adjustable electrical condensers and refers more particularly to that type of such condensers in which a plurality of fixed spaced condenser plates, arranged in a group, are adapted to co-operate with a plurality of spaced adjustable plates which are grouped and interleaved with the fixed plates in such a way that movement of the movable plates varies the capacity of the condenser.

One of the objects of the invention is to produce an adjustable condenser of this general type wherein the fixed and movable plates of the units, each arranged in groups, are so attached to their respective supports as to insure rigid fixment of the plates of each unit to their supports, and to provide uniform spacing of the plates in such a way that no shifting from accumulative error, due to the varying thickness of the plates or spacings therefor, can alter a predetermined spacing.

This feature of the invention can be manifested by independently setting and fixing the plates of each group in die-formed slots of curved, continuous metal supports which can be accurately fixed as to spacing and, by reason of the rigid fixing means of the plates to their supports which bear said slots, the said plates must also be uniformly spaced. By the same token, the interleaved plates of the groups are uniformly spaced, thereby providing for accurate capacity adjustments upon the movement of one group of plates relatively to the other throughout the total range of movement. Such movement of adjustment is herein shown and preferably will be a rotary movement.

A further object of the invention is to provide a novel means of fixedly securing the stationary plates on a curved shell and which may additionally be made of a material to constitute a shield for the group of plates.

Another object of the invention is to provide a novel means of attaching the movable plates to a rotary support constituting a shaft for giving movement to said movable or adjustable plates, in such a manner that the movable plates are rigidly attached to the shaft by means which avoid accumulative spacing errors and compels accurate, uniform spacing of the movable plates.

Another object of the invention is to provide a novel vernier element which co-operates with the fixed and movable units and to novel means for mounting the vernier element for co-operation with the said other units of the condenser.

A further object of the invention is to produce an adjustable condenser of this character wherein a single rotary bearing can be used between the supports for the plates and a dependable electrical contact for the rotor; and, in this connection, to provide a bearing which is self-cleaning with respect to oil or other extraneous matter that may tend to cling thereto.

A further object of the invention is to produce a novel adjustable condenser, the parts of which can be in large part made by simple stamping and punching operations and in such manner that the parts which make up the different elements and units can be very quickly and economically assembled in a machine designed for that purpose. The machine assembling of the elements, taken in connection with the punch and die operations for producing the connections between the plates and their supports, co-operate to insure an assembly of the units with the plates uniformly and permanently spaced.

A further object of the invention is to produce a condenser in which the electrical elements can be made integral parts of the frame, thereby insuring rigidity and dependable electrical connections.

Another object of the invention is to produce a construction wherein the grounding plate to which one binding post is fastened can be made the base plate of the condenser and adapted for attachment to a panel or other support.

Other objects of the invention are to otherwise improve and simplify electrical condensers, and the invention consists in the elements and combination of elements shown in the drawings, described in the specification, and is pointed out in the appended claims.

In the drawings:

Figure 1 is a side elevation, with parts broken away, of an adjustable condenser embodying my invention, and showing also a panel on which it is supported.

Figure 2 is an inner end view thereof.

Figure 3 is an enlarged detailed section on the line 3—3 of Figure 2.

Figures 4 and 5 are cross-sections on the respective lines 4—4 and 5—5 of Figure 3 broken away.

Figure 6 is a fragmentary perspective view illustrating the manner of connecting the fixed unit plates to the metal shield.

Figure 7 is a perspective view of a tube constituting part of the rotary shaft on which the adjustable unit plates are mounted.

Figure 8 is a perspective view of a comb-like key for spacing and holding the adjustable unit plates on said shaft.

Figure 9 is a diagrammatic view illustrating the manner of assembling the movable plates on the rotary shaft or support therefor.

Figure 10 is a side elevation of one of the plates of the fixed group.

Figure 11 is an end elevation of a portion of the compound shaft for the plates of the movable unit, showing the manner in which the plate spacing and attaching members are assembled thereon.

10 designates a panel on which the condenser is mounted and may comprise a front panel of a radio-receiving set. 11—11 designate a group of fixed plates constituting one of the units of the condenser. 12—12 designate the plates constituting the movable unit and 14 designates a single plate constituting a vernier unit of the condenser. The fixed and movable plates have a general semi-circular outline, differing from each other principally in the details by which they are fastened to their supports. The plates 11 and 12, constituting the principal units, are interleaved in the known manner of condensers of this type. In accordance with the present invention, the fixed plates are attached at their outer edges to curved or angularly continuous part circular shell 15 and are free at their inner edges. The inner edges of the movable plates 12 are attached to a compound rotary shaft, designated as a whole by 16 in Figure 3.

The said 15 is supported at its outer edge by an annular plate 18 through which the outer end of the compound shaft 16 extends. It may be termed the base plate, and through it and the shell 15 the plates 11 of the stationary group can be connected to one side of a condenser circuit. The said base plate 18 is provided with an integral terminal 18' having a binding post for connection to one side of the condenser circuit. The said base is connected to a ground plate 19 concentric therewith by bolts 20, 20, the countersunk heads of which fit in countersunk recesses formed near the margins of said plate, and said plates are insulated from each other by insulating sleeves 21, 22, the whole being fixedly secured together by the clamping washers or nuts threaded or otherwise fixed to the inner ends of said bolts. The ground plate is provided with an integral terminal 19' for a binding post through which connection is made to the ground. The ground plate constitutes also means for fixing the condenser to the panel 10, as by the screws 24.

The ground plate 19 is centrally perforated for the passage of a tube 26 constituting part of the compound shaft 16. The said tube 26 is rotatively mounted in a short bearing sleeve 27 that extends through the flattened center 28 of the inwardly coned part of the said ground plate 19. Said bearing sleeve is fixed to said ground plate by clamping nuts 30 that are threaded on the outer end of the bearing sleeve and bears against said central flattened part 28, as best shown in Figure 3. The tube 26 is formed with a plurality of longitudinally angularly spaced slots 26', for a purpose hereinafter described. 31 designates a solid tube which is within and engages the slitted tube with a drive fit, for a purpose hereinafter described. The slitted tube 26 extends at its outer end beyond said bearing sleeve 27 and is threaded to receive a lock nut 32 between which and the outermost clamping nut 30 a spring washer 33 is confined. Said spring washer is herein shown as corrugated to provide a plurality of spaced bearing contacts between it and the said clamping and lock nuts, whereby relative movement of the washer on said nuts has the effect to maintain the thrust bearing afforded thereby clean from extraneous matter that might otherwise tend to cling thereon.

35 designates a shaft which is rotatably mounted in the inner solid tube 31 and supports at its inner end the vernier plate unit 14 which is located entirely beyond the end of the fixed end movable units. Said vernier plate or unit is clamped between inner and outer nuts 36 threaded to the inner end of the shaft 35. The solid portion of the tube 31 extends through the panel 10 to receive at its outer end a known form of dial 37 that is threaded or otherwise fixed to the tube, and is graduated to co-operate with a fixed indicator on the outer face of the panel 10. The solid shaft 35 extends through and beyond the outer end of said hollow tube 31, and to the outer end thereof is fitted a knob 38 for rotating said shaft and vernier unit 14. A spring 39 surrounding said shaft 35 and interposed between said knob and dial serves to force the inner clamping nut 36 on said shaft solidly against the inner end of the compound shaft 16.

Referring now to the shell 15 and the manner of fixing the plates of the stationary units thereto, it will be noted that said fixed plates are provided on their curved edges with a plurality of rounded attaching lugs 45 and are formed at their centers with concave depressions 46 to provide clearance for the compound shaft 16 and the hubs 47 of the movable plates 12 (Figures 6 and 10). Each of said fixed plates is provided as herein shown with three of said attaching lugs 45 disposed at equal angular distances apart, and so arranged that the corresponding lugs of all of the plates, when assembled, are in line. The shell 15 is punched to provide spaced slots 48 to receive the lugs 45, and the metal which is punched out from the body of the shield can be swaged and curved outwardly to form reinforcing arch-like braces 49. The said lugs 45 are made of a width and thickness to closely fit in said slots and are made of a depth to closely engage the inner faces of the braces 49. All of the parts described are cut and punched by die-operations and the interlocking parts may, therefore, be made exceedingly accurate to produce, not only a rigid, accurately-spaced mechanical connection between the plates and shield, but also a close electrical connection between said parts, and a connection that will prevent relative warping of the plates. A reversal of this specific detail to fix the plates and shell may be resorted to.

The plates 12 constituting the movable unit are curved at their outer peripheral edges and are spaced from the shell 15, and as before noted, straight at their inner edges save for hollow hubs 47 at the center of the condenser structure for connection with the compound shaft 16. As a further and separate improvement, I have provided novel means for fixing the plates of said movable unit to said compound shaft, so arranged as to provide an exceedingly rigid connection with said shaft and which will insure uniform spacing and parallel disposition of the plates of the movable unit.

It is for this purpose that the shaft 26 is provided with the slits 26'. Associated with the slitted portion of the shaft 26 are a plurality of rigidly disposed comb members 51, each comprising one or more bars straight on one edge and provided on the other edge with notches 52. Preferably, and as shown in Figures 4 and 5, these comb members are thin and are arranged flat-wise in pairs, or split in two parts. They are of such depth that they can be assembled in the outer slitted portion of the tube 26 partially within said slits and with their outer notched edges within the circumferential line of said tubular slitted portion, and with their inner or back edges out of contact with each other, as indicated in Figure 11. When the said comb members are thus assembled in said slitted tubular member 26, the apertured hubs 47 of the movable plates 12 can be slipped endwise over said tubular member containing the comb members. This assembling will in practice be made in suitable jigs or like assembling and holding means so that the plates 12 can be brought down exactly in alignment with the notches 52 of the comb members 51 and held temporarily in special relation. Thereafter the said comb members are spread radially outwardly to bring their notched edges beyond the circumferential outline of the slitted portion of the tube 26 so as to engage their notches 52 over the margins of the openings in the hubs 47 and to thus interlock the parts securely together and space the plates uniformly apart, due to the accurate spacing of the notches when cut in the comb members.

A means for spreading said comb members is shown in Figure 9 wherein 55 designates a spreader tool having a reduced end 56 which is adapted to be introduced into the slitted tubes 26 into the space surrounded by the inner edges of the comb members 51. The said spreader tool has a cone portion 57 which, at its base, is substantially of the same diameter as the diameter of the inner solid tube of the compound shaft. The machine or jig for assembling the parts is such that the slitted tube and the comb members are assembled and the hubs of the plates 12 are slipped thereover and arrested in register with the notches 52 of the comb members, whereupon the spreader is forced between the comb members until its conical part force said comb members through the slits with their notches engaged over the inner margins of the openings in the hubs 47 of said plates to thereby lock the plates 12 to the compound shaft. The said spreader can be followed by the inner solid tube 31 which fits within the tube 26 with a driving fit and serves as a key to rigidly hold said assembled parts in permanent position.

It will be observed that the plates of each group are rigidly locked to a curved, continuous support (the plates 11 to the continuous shell 15 and the plates 12 to the continuous structure afforded by the spreaded combs and the surrounding slitted tube). Therefore, the plates are and must be held rigidly in parallel relation to each other, in addition to their accurate spacing. The support or shell 15 can also be made to constitute an electrical shield for the condenser structure.

I claim as my invention:—

1. A variable electrical condenser, comprising stationary plates and interleaved relatively movable plates, and a curved, continuous support for the stationary plates including means integral with said support to independently space each plate on the support relatively to the other to avoid accumulative spatial error due to varying thickness of plates.

2. A variable electrical condenser, comprising stationary plates and interleaved relatively movable plates, and a support for the stationary plates including means integral with the support to independently space each plate on the support to avoid accumulative spatial error due to varying thickness of plates, the support for said fixed plates constituting a metal shield for the condenser.

3. A variable electrical condenser comprising stationary elements having lugs on the edges and interleaved rotative elements, with means to rotate the latter, and a curved, continuous support for the stationary elements provided with accurately spaced recesses to receive lugs on the adjacent edges of said stationary elements, there being a plurality of recesses and lugs for each stationary element.

4. A variable electrical condenser including stationary elements and interleaved rotative elements, with means to rotate the latter and a curved combined shield and support for the stationary elements provided with accurately spaced slots to receive lugs on the adjacent edges of said stationary elements, the metal punched from said shield and support constituting arched reinforcements to limit and fit said lugs.

5. A condenser unit comprising a series of plates and a mounting and rotative shaft therefor, embracing members having accurately spaced notches to tightly receive the edges of said plates and a backing element centrally within the said members to rigidly hold the latter spread in holding and spacing positions.

6. A condenser comprising stationary plates and their support, interleaved rotative plates and a shaft for supporting and accurately spacing the rotative plates, including a rotative tube having angularly spaced slits, notched comb members insertable in said slits with their notches fitting over the adjacent edges of the rotative plates, and a key member for backing said notched comb members.

7. An electrical condenser unit comprising a series of rotative plates and a composite shaft for rotating them, said shaft including a slitted outer and a solid inner member, and notched comb members extending with their notched sides through the slits of the slitted member for engagement with said plates and backed by said solid member.

8. An electric condenser including a unit composed of spaced condenser elements and a compound shaft embracing a slitted and a contained tube, a key element and notched spacing members assembled in and extending through the slits of the slitted tube, and means holding said members outwardly for fast engagement with said elements and backed by said key element.

9. An electric condenser comprising a unit composed of spaced condenser elements and a compound shaft embracing a slitted and a contained key tube, a key element, and notched spacing members assembled in and extending through the slits of the slitted tube, and means holding said members outwardly for fixed engagement with said elements and backed by said key element, a shaft extending through and having rotative bearing in said tube, and a second condenser element fixed to said shaft in capacity varying relation to said fixed plates.

10. Means to fasten the rotative condenser elements of an electrical condenser to a compound supporting shaft therefor, wherein the said shaft embraces a slitted outer portion and an inner key portion, and notched elements assembled in the slits of the slitted portion into which the margins of the elements are tightly fitted, a key element, the notched elements being backed by said key element of the shaft and held in positions in which they project outwardly through the slits into close fitting engagement with the margins of apertured hubs of said condenser elements.

11. Means to fasten the rotative condenser elements of an electrical condenser to a compound actuating shaft therefor, wherein the said shaft embraces a slitted outer portion and an inner key portion, and notched elements extending outwardly through said slits and held by the key portion element over the margins of said elements, said key portion being tubular, a shaft extending through and having bearing therein and a second condenser unit fixed to said shaft and overlapping the first condenser units.

12. A plurality of condenser elements, a compound actuating shaft therefor embracing a slitted outer portion and an inner key portion, and notched members assembled in the slits of the slitted portion into which the margins of the elements are tightly fitted, said members being backed by said key portion and held in close fitting engagement with the margins of apertured hubs of said condenser elements, and bearings for the ends of said notched holding members.

13. A plurality of spaced condenser elements, and a tubular rotative actuating and supporting shaft therefor having at one end means to turn said shaft, combined with a second shaft having a bearing in said actuating shaft and provided with a rotating knob adjacent said rotative means, and at its other end with a second condenser element, and a spring acting endwise on said second shaft to hold said condenser member in capacity relation to said first condenser elements.

14. In a condenser unit, a group of spaced plates and an angularly continuous support for said plates, including means distributed along each plate to independently space said plates relatively to each other to avoid accumulative spatial error due to varying thicknesses of plates.

In witness whereof I claim the foregoing as my invention, I hereunto append my signature this 23 day of December, 1922.

CHESTER H. THORDARSON.